US012785121B2

(12) United States Patent
Kemmer et al.

(10) Patent No.: US 12,785,121 B2
(45) Date of Patent: Nov. 3, 2026

(54) METHOD FOR PURGING A REACTANT CHAMBER

(71) Applicant: Robert Bosch GmbH, Stuttgart (DE)

(72) Inventors: Helerson Kemmer, Vaihingen (DE); Mark Hellmann, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 522 days.

(21) Appl. No.: 18/554,664

(22) PCT Filed: Mar. 31, 2022

(86) PCT No.: PCT/EP2022/058555
§ 371 (c)(1),
(2) Date: Oct. 10, 2023

(87) PCT Pub. No.: WO2022/223259
PCT Pub. Date: Oct. 27, 2022

(65) Prior Publication Data

US 2024/0194908 A1 Jun. 13, 2024

(30) Foreign Application Priority Data

Apr. 19, 2021 (DE) ..................... 10 2021 203 844.1

(51) Int. Cl.
*H01M 8/04223* (2016.01)
*H01M 8/0438* (2016.01)
(Continued)

(52) U.S. Cl.
CPC ..... *H01M 8/04231* (2013.01); *H01M 8/0438* (2013.01); *H01M 8/04492* (2013.01); *H01M 8/04589* (2013.01); *H01M 8/04679* (2013.01)

(58) Field of Classification Search
None
See application file for complete search history.

(56) References Cited

U.S. PATENT DOCUMENTS

2007/0026276 A1 2/2007 Ogawa et al.
2021/0091397 A1* 3/2021 Kim .................. H01M 8/04395

OTHER PUBLICATIONS

Jenssen et al., "Anode flooding characteristics as design boundary for a hydrogen supply system for automotive polymer electrolyte membrane fuel cells," Journal of Power Sources, 2015, vol. 298, pp. 249-258.

(Continued)

*Primary Examiner* — Wyatt P McConnell
(74) *Attorney, Agent, or Firm* — Michael Best & Friedrich LLP

(57) ABSTRACT

The invention relates to a method for purging a reactant chamber (A, K), in particular an anode chamber (A) and/or a cathode chamber (K), of a fuel cell system (100), having the steps of:

- determining a critical value (Pcritical) for an operating parameter (P) of the fuel cell system (100), said critical value characterizing a flooding of the reactant chamber (A, K),
- monitoring the operating parameter (P) to check if the critical value (Pcritical) has been reached,
- setting a threshold (Nmax) for a counter (N), in particular a time-dependent counter,
- monitoring the counter (N) to check if the threshold (Nmax) has been exceeded, and
- carrying out a purge process (DRAIN) of the reactant chamber (A, K) if the operating parameter (P) has reached the critical value (Pcritical) and if the counter (N) has reached the threshold (Nmax).

13 Claims, 5 Drawing Sheets

(51) Int. Cl.
*H01M 8/04492* (2016.01)
*H01M 8/04537* (2016.01)
*H01M 8/04664* (2016.01)

(56) References Cited

OTHER PUBLICATIONS

Translation of International Search Report for Application No. PCT/EP2022/058555 dated Jan. 4, 2023 (2 pages).

* cited by examiner

METHOD FOR PURGING A REACTANT CHAMBER

BACKGROUND

The invention relates to a method for purging a reactant chamber, in particular an anode chamber and/or a cathode chamber, of a fuel cell system. The method may also be referred to as a drain method.

Fuel cells are considered a promising approach for sustainable energy supply in mobile applications, for example vehicles, but also in stationary applications, for example generators. The fuel cell systems mostly comprise multiple fuel cells assembled into a stack. In addition, the fuel-cell systems comprise at least four subsystems, including: a cathode system to supply an oxygen-containing gas mixture to a cathode chamber of the fuel cell system, an anode system to supply a fuel-containing gas mixture to an anode chamber of the fuel cell system, a cooling system to temperature-control the fuel cell system, and an electric system to dissipate the generated electrical power from the fuel cell system. In the fuel cells, fuel and oxygen react and generate electrical current, heat and water. The water generally arises on the cathode side of the system, but can also diffuse into the anode space, for example due to pressure differences. The water must be reliably removed from the reactant chambers in order to avoid flooding the chambers. Flooding of the chambers can lead to local starvation (too low a concentration of reactants), loss of efficiency, or even degradation of the system. The flooding can occur, for example, when the amount of water produced cannot be completely removed and the water storage capacity of the fuel cells (e.g., in the mesh of a flow field) is exhausted.

The discharge of liquid water from the fuel cells primarily depends on the flow conditions in the respective reactant chamber. At high electrical loads, the flow is sufficiently high so that the water can be carried away by the flow. If the actual flow falls below a certain critical volume flow, there is insufficient discharge of liquid water. The water storage volume of the fuel cells is filled and the risk of flooding increases. The risk of flooding of the fuel cells also increases at low temperatures, which lower the saturation vapor pressure and thus the total amount of liquid water that can be discharged in the vapor phase.

The anode chamber and the cathode chamber are mostly operated with a stoichiometric factor, a so-called stoichiometry, >1. The higher the stoichiometry $\lambda >> 1$, the better the water can be transported away by the flow. However, high stoichiometry causes significant parasitic electrical losses in the fuel cell system, as they are achieved by pumps (e.g., anode circulation pump) and compressors (e.g., turbo compressors in the air system). Also, high levels of stoics cause inefficient fuel consumption. The higher the stoichiometry, the higher the power demand, the losses and the effort in the system components.

SUMMARY

The present invention provides a method for purging a reactant chamber, in particular an anode chamber and/or a cathode chamber, of a fuel cell system having the features of the disclosure. Of course, features and details described in connection with the different embodiments of the invention also apply in connection with the other embodiment of the invention, and respectively vice versa, so that with respect to the disclosure, mutual reference to the individual embodiments of the invention is or can always be made.

The present invention provides a method for purging a reactant chamber, in particular an anode chamber and/or a cathode space, of a fuel cell system having the steps of:

determining a critical value for an operating parameter of the fuel cell system, said critical value characterizing or specifying a flooding of the reactant chamber, such as for an electric current and/or for a volume flow of a gas mixture, monitoring the operating parameter to check if the critical value has been reached, wherein, in particular in the case of electrical current and/or a volume flow of a gas mixture, the operating parameters can be monitored for a drop below the critical value, wherein at least one further operating parameter is conceivable, which may exceed a certain maximum critical value during a flooding of the fuel cell, such as the pressure drop across the reactant chamber of the fuel cell system, setting a threshold for a counter, in particular a time-dependent counter, such as for a time and/or for an integral value for the power generated by the fuel cell system over a time, monitoring the counter to check if the threshold has been exceeded, performing a purge process of the reactant chamber, when the operating parameter has reached the critical value, and when the counter has exceeded the threshold, wherein preferably the counter can be reset to zero when a purge process of the reactant chamber has been performed, and/or when a purge process of the reactant chamber of the fuel cell system has been performed, and/or when the operating parameter exits the critical value and/or reaches a safe value, or when the system is again in normal operation, for example full power operation.

Advantageously, the steps of the method may be repeated. At each pass, the counter may be raised to a particular step value.

During a pass of the method, the method steps can be carried out at least to some extent simultaneously and/or consecutively.

The invention assumes that when the operating parameter reaches the critical value, the amount of water produced cannot be completely removed so that the water storage capacity of the fuel cells, e.g., in the mesh of a flow field, such as a gas diffusion layer, can be exploited gradually. In this case, one can speak of a reduced power operation of the fuel cell system, which may be required, for example, when starting the system, during stop-and-go behavior, or the like.

The operating parameter is determined in the context of the invention to be specific for a reduced electrical power of the system and thus for a flooding of the reactant chamber. In particular, the operating parameter may represent a system variable on which the electrical power of the system depends.

Using the example of electrical current as a possible operating parameter within the scope of the invention, a low current may be specific for reduced electrical power of the system and thus for flooding of the reactant chamber. In this case, the critical value may be determined as a minimum value for the electrical current. The critical value may be derived, for example, from empirical values.

Using the example of the volume flow of a gas mixture with which a reactant is directed to the fuel cell stack, as a possible operating parameter, a low volume flow may also be specific for a reduced electrical power of the system and thus for a flooding of the reactant chamber. In this case, the critical value may be determined as a minimum value for the volume flow. The critical value may also be derived, for example, from empirical values.

Another conceivable operating parameter is the ratio of inertia to toughness forces in the volume flow of the gas mixture with which a reactant is directed to the fuel cell stack, or the Reynolds number. The Reynolds number can be monitored for dropping below a minimum value as the critical value.

At the same time, a further operating parameter is conceivable, for example, the pressure drop across the reactant chamber. If there is comparatively low pressure at the exit from the reactant room, this may be indicative of flooding because not enough gas mixture may escape out of the reactant chamber. In this case, the pressure drop may be monitored for exceeding a maximum value as the critical value.

Advantageously, not only one operating parameter, but several operating parameters can be monitored for reaching the critical value in order to check plausibility of the risk of flooding and to increase the efficiency of the method.

Using the invention, the frequency and duration of the purge processes may be adjusted to the actual prevailing conditions in the system with a high accuracy. Thus, the purging of the reactant chambers can be designed efficiently. The corresponding actuators, such as compressors in the cathode system and/or pumps in the anode system are only purposefully ramped up to perform the purging of the reactant chamber. Thus, parasitic electrical losses in the fuel cell system may be significantly reduced. Fuel consumption can also be designed efficiently as a result. In addition, the system can thereby be used with moderate stoichiometry, such as $\lambda=1.5$.

Furthermore, a method may provide that the operating parameter monitored for reaching the critical value is dependent on at least one of the following parameters:

electrical current generated by the fuel cell system, and/or volume flow of a gas mixture directed through the reactant chamber of the fuel cell system, and/or Reynolds number specific to a flow in the reactant chamber of the fuel cell system.

The electric current and the volume flow of the gas mixture are usually acquired inherently in the system. Thus, the method can rely on existing sensors to perform an advantageous actuation of the purge processes. The Reynolds number cannot be directly measured. For example, the flow rate of the gas mixture can be measured for this purpose. By monitoring the Reynolds number, the actual prevailing conditions in the system can be determined with a high accuracy.

It can further be provided in a method that the operating parameter, such as electrical current, volume flow, and/or the Reynolds number are monitored for dropping below the critical value. In this way, a simple prognosis of an impending flooding of the reactant chamber can be made in terms of control.

Furthermore, a method may provide that the operating parameter monitored for reaching the critical value is dependent on at least one of the following parameters:

the pressure drop occurring across the reactant chamber of the fuel cell system.

The pressure may also be recorded inherently in the system. An excessive pressure drop may be a sign of flooding. To predict an impending flooding, the operating parameter can be monitored for exceeding the critical value.

It is further conceivable that the counter being monitored for exceeding the threshold is dependent on at least one of the following parameters:

time, and/or integral value for the current generated by the fuel cell system over a time.

If the time is selected as the counter, the method may be performed with a reduced control demand. If the integral value is selected for the current as the counter, the method may be performed with increased efficiency. Since the amount of water produced corresponds to the cumulative amount of current, the frequency and duration of the purge processes can be adjusted very precisely by such a counter. To further refine the method, it is conceivable that the actual amount of vapor removed by the flow may be subtracted from the cumulative amount of current. This may be calculated using the corresponding saturation vapor pressure and mass air flow. The difference between the amount of water produced and the cumulative amount of current (determined by the time integral of the current) and the amount of vapor removed results in the amount of water actually stored in the cells with an increased accuracy. After reaching the threshold, which, for example, corresponds to the storage capacity of the porous layers and hydrophilic surfaces of the cells, the drain process can be purposefully triggered.

Advantageously, an amount of water in the reactant chamber of the fuel cell system may be modeled and/or estimated using the operating parameter.

In addition, it may be advantageous if, when determining the critical value of the operating parameter and/or the threshold of the counter, an actual amount of water in the reactant chamber of the fuel cell system is taken into account, in particular recorded directly and/or indirectly.

In order to prevent unnecessary purge processes, the method may comprise at least one of the following steps:

setting the counter to zero, when a purge process of the reactant chamber has been performed, and/or when a purge process of the reactant chamber of the fuel cell system has been performed, and/or when the operating parameter exits the critical value and/or reaches a safe value.

Advantageously, the method may be performed for an anode chamber and/or a cathode chamber of the fuel cell system, in particular simultaneously, at least partially overlapping and/or successively.

In order to perform the method for an anode chamber and/or a cathode chamber of the fuel cell system individually, different, in particular, individual, threshold values for the counter can be determined.

In systems with a combined purge and/or drain valve, it may be advantageous to check whether a purge of the reactant chamber of the fuel cell system is being performed before monitoring the counter for exceeding the threshold value. The purge process may favor the removal of the water. In this way, unnecessary purge processes or drain operations can be avoided.

The method can advantageously be carried out by a control unit of the fuel cell system. A corresponding computer program can be stored in a memory unit of the control unit in the form of a code, which, when the code is executed by a computing unit of the control unit, carries out a method that can proceed as described above. The control unit may be in a communication link with sensors of the system. The control unit may control the actuators in the system to perform the purge processes accordingly.

BRIEF DESCRIPTION OF THE DRAWINGS

The invention and its further developments, as well as its advantages, will be explained in further detail below with reference to the drawings. The drawings schematically show.

In the various figures, like parts of the invention are always given the same reference numbers, for which reason they are typically only described once.

DETAILED DESCRIPTION

Figure 1:
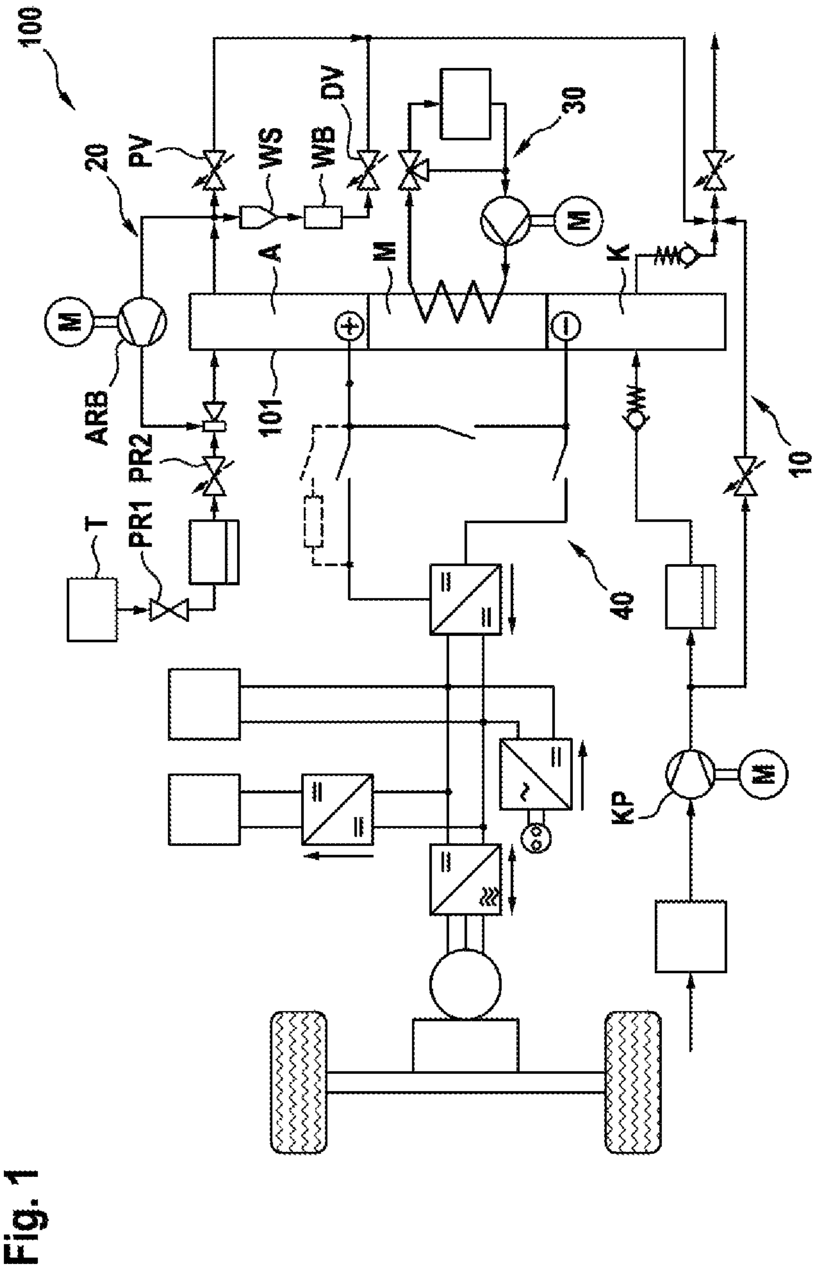
FIG. 1 an exemplary fuel cell system.

FIG. 1 shows a possible fuel cell system 100 within the scope of the invention. The fuel cell system 100 mostly comprises multiple fuel cells 102 assembled into a stack 101. In addition, the fuel cell system 100 comprises at least four subsystems 10, 20, 30, 40, including: a cathode system 10 to supply an oxygen-containing gas mixture to a cathode chamber K of the stack 101, an anode system 20 to supply a fuel-containing gas mixture to an anode chamber A of the stack 101, a cooling system 30 to temperature-control the stack 101, and an electric system 40 to dissipate the generated electrical power from the stack 101.

Figure 2:
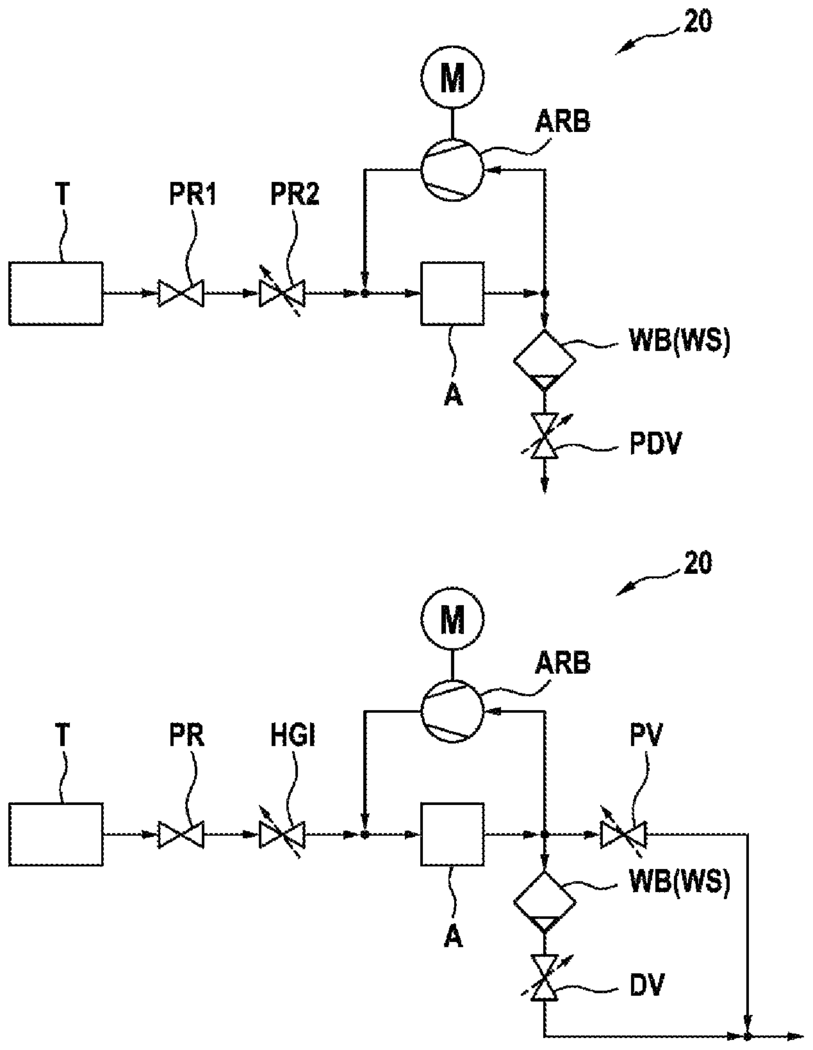
FIG. 2 two variants of an anode system having a combined purge and/or drain valve and two separate valves for a purge process and for a drain process, FIG. 3 a schematic diagram of a fuel cell, FIG. 4 a functional representation of an amount of water removed from a fuel cell as a function of a volume flow of a gas mixture, FIG. 5 a possible sequence of a method in the sense of the invention, and FIG. 6 a further possible sequence of a method in the sense of the invention.

FIG. 2 shows two examples of an anode system 20 comprising a fuel tank T, from which a fuel is supplied to an anode chamber A of the stack 101 of the fuel cell system 100 after one or two pressure reduction stages PR1, PR2. A fuel-containing gas mixture is sent back into anode chamber A using a recirculation pump ARB. As shown in FIG. 2, in the anode system 20, a combined purge and/or drain valve PDV or two separate valves PV, DV may be provided for a purge process and for a drain process. In the drain section, a container WB can be provided with a separate water separator WS (see, for example, FIG. 1) or with an integrated water separator WS (see, for example, FIG. 2).

Figure 3:
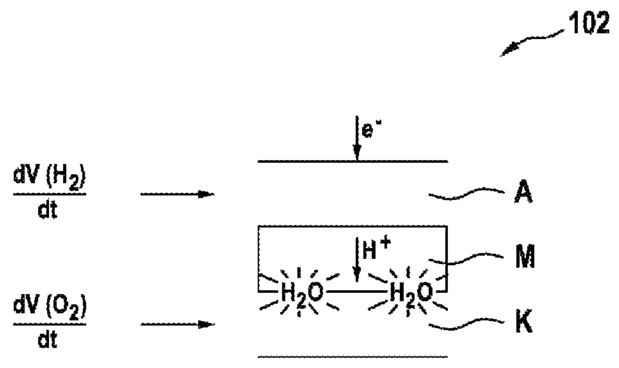

An exemplary fuel cell 102 is shown in FIG. 3. In stack 101, fuel H2 and oxygen O2 react and generate electrical current I, heat and water H2O. The water H2O generally arises in the cathode chamber K of the fuel cell 102, but may also diffuse into the anode chamber A, for example due to pressure differences between the cathode chamber K and the anode chamber A, through a membrane M. The water H2O must be reliably discharged from reactant chambers A, K to avoid flooding of reactant chambers A, K, which may result in localized starvation with too low a concentration of reactant H2, O2, loss of efficiency of fuel cell system 100, or even degradation of stack 101. The flooding can occur, for example, when the amount of water H2O produced cannot be completely removed and, at the same time, the water storage capacity of the fuel cells 102 is exhausted.

Figure 4:
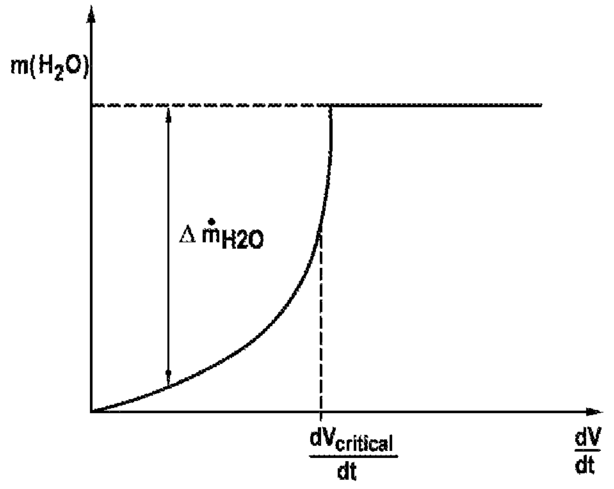

The discharge of liquid water H2O from the fuel cells 102 depends primarily on the flow ratios in the respective reactant chamber A, K, as FIG. 4 indicates. At high electrical loads, the volume flow dV/dt is sufficiently high to remove the water H2O. If the actual volume flow dV/dt drops below a critical volume flow dVcritical/dt, there is insufficient removal of liquid water H2O (cf. FIG. 4). The water storage volume of the fuel cells 102 is filled until the reactant chambers A, K are flooded.

The anode chamber A and the cathode chamber K are mostly operated with a stoichiometric factor, a so-called stoichiometry, >1. The higher the stoichiometry λ>>1, the better the water H2O can be transported away by the flow. However, high stoichiometry causes significant parasitic electrical losses in the fuel cell system achieved by pumps, such as the recirculation pump ARB in the anode system 20 and a compressor K in the cathode system K. In the anode system 20, high stoichiometry also causes inefficient fuel consumption.

The present invention provides an improved method for purging a reactant chamber A, K, such as an anode chamber A and/or a cathode chamber K, of a fuel cell system 100.

Figure 5:
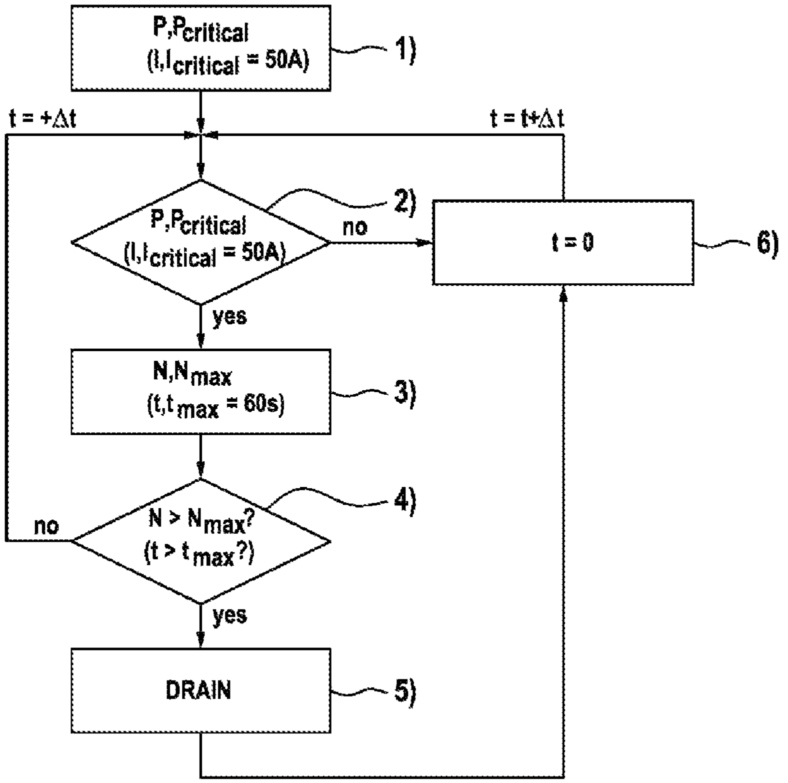
Figure 6:
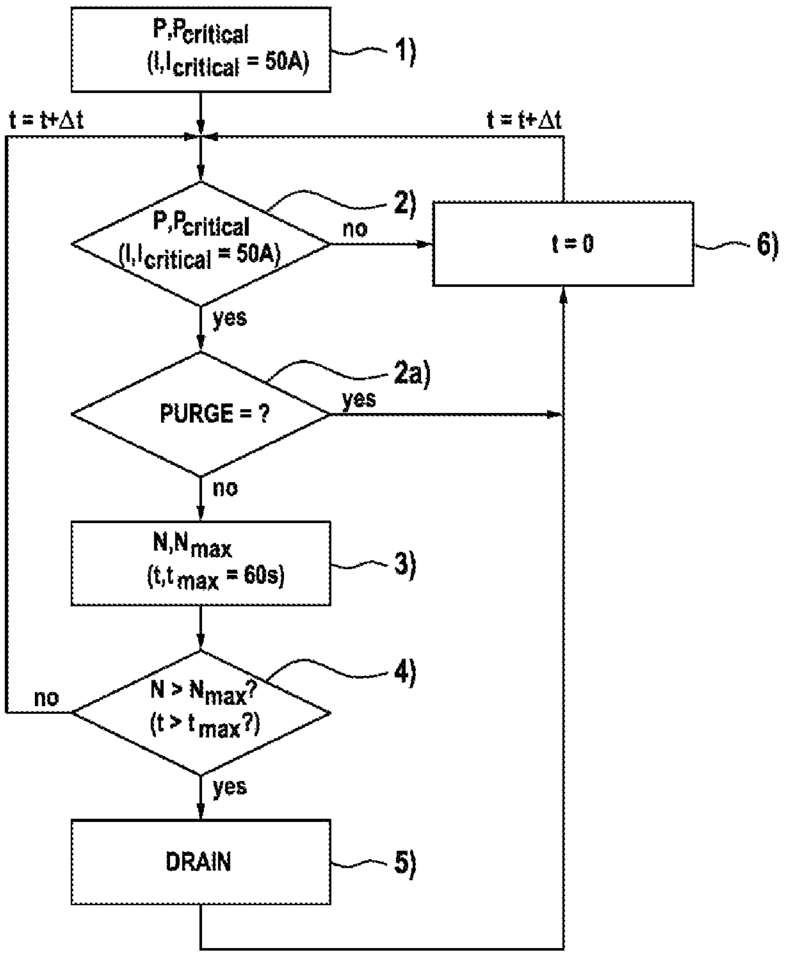

The method may be explained using FIGS. 5 and 6, wherein the method comprises the steps of:

- determining a critical value Pcritical for an operating parameter P of the fuel cell system 100, said critical value characterizing a flooding of the reactant chamber A, K.

As an example of an operating parameter P, an electrical current I P is shown in FIG. 5. The critical value Icritical can be, for example, 50 A.

monitoring the operating parameter P to check if the critical value Pcritical has been reached.

In the example of electrical current I, the operating parameter P is monitored for dropping below the critical value Pcritical.

setting a threshold Nmax for a counter N, in particular a time-dependent counter.

As an example of a counter N, the time t is selected in FIG. 5. The threshold tmax can be, for example, 60 s.

- monitoring the counter N to check if the threshold has been exceeded, and
- performing a purge process DRAIN of reactant chamber A, K, when the operating parameter P has reached the critical value Pcritical, and when the counter N has exceeded the threshold Nmax.

Steps 1) to 5) of the method may advantageously be repeated. With each pass, the counter N can be raised to a certain step value N=N+ΔN (e.g., t=t+Δt).

During a pass of the method, the method steps 1) to 5) can be carried out at least to some extent simultaneously and/or consecutively.

In a further step, the method may provide:

setting the counter t back to zero t=0,

- when a purge process DRAIN of reactant chamber A, K was performed in step 5),
- and/or when a purge process PURGE of reactant chamber A, K of fuel cell system 100 has been performed, cf. step 2a) in FIG. 6,
- and/or when the operating parameter P exits the critical value Pcritical and/or reaches a safe value, for example, when the system 100 is back in normal operation or in full power operation.

As also shown in FIG. 6, before monitoring the counter N for exceeding the threshold Nmax in step 3), it can be checked in an intermediate step 2a) whether a purge process PURGE of reactant chamber A, K of the fuel cell system 100 is performed. This may be particularly advantageous for anode systems 20 having two separate valves PV, DV for a purge process and for a drain process.

The operating parameter P may be determined to be specific for a reduced electrical power of the system 100 and thus for a flooding of the reactant chamber A, K. Operating parameter P may in particular represent a measurable and/or detectable variable in system 100 that affects an electrical power of system 100.

Using the example of electrical current I as a possible operating parameter P, a low current I<Icritical may be specific for reduced electrical power of the system 100 and thus for a flood of the reactant chamber A, K. In this case, the critical value Pcritical may be determined as a minimum value Icritical for the electrical current I.

Using the example of a volume flow dV/dt of a gas mixture with which a reactant $H_2$, $O_2$ is directed to the fuel cell stack 101, as a possible operating parameter P, a low volume flow dVcritical/dt (cf. FIG. 4) may also be specific for a reduced electrical power of the system 100 and thus a flooding of the reactant chamber A, K. In this case, the critical value Pcritical may be determined as a minimum value dVcritical/dt for the volume flow dV/dt.

The critical value Pcritical can be derived, for example, from empirical values or calculated theoretically or simply estimated.

Another conceivable operating parameter P is the ratio of inertia to toughness forces in the volume flow dV/dt of the gas mixture with which a reactant $H_2$, 02 is directed to the fuel cell stack 101, or the Reynolds number Re. The Reynolds number Re can be monitored for dropping below a minimum value Recritical as the critical value Pcritical.

Another conceivable operating parameter P is the pressure drop $\Delta p$ across the reactant chamber A, K. When the reactant chamber A, K is flooded, not enough gas mixture can escape out of reactant chamber A, K. In this case, the pressure drop $\Delta p$ may be monitored for exceeding a maximum value $\Delta$pcritical as the critical value Pcritical.

Advantageously, not only one operating parameter P, but several operating parameters P can be monitored for reaching the critical value Pcritical in order to increase the efficiency of the method.

To refine the method, the counter N may be determined as an integral value dI(t) for the current I generated by the fuel cell system 100 over a time t. Since the amount of water produced corresponds to the cumulative amount of current, the frequency and duration of the purge processes or drainage events can be adjusted very precisely by such a counter N.

To further refine the method, the actual amount of vapor removed by the flow may be subtracted from the cumulative amount of current. The actual amount of vapor removed may be calculated using the corresponding saturation vapor pressure and mass air flow. The difference between the cumulative amount of current (the time integral of the current dI(t)) and the amount of vapor removed results in the amount of water actually stored in the fuel cells 102 with an increased accuracy.

Advantageously, the method may be performed for an anode chamber A and/or a cathode chamber K of the fuel cell system 100, in particular simultaneously, at least partially overlapping, and/or successively. It is also conceivable that different thresholds NmaxA, NmaxK for the counter N, are determined to perform the method for anode chamber A and/or perform the method for cathode chamber K of the fuel cell system 100.

The above description of the figures describes the present invention solely in the context of examples. Of course, individual features of the embodiments can be freely combined with one another, insofar as technically sensible, without leaving the scope of the invention.

The invention claimed is:

1. A method for purging a reactant chamber of a fuel cell system, the reactant chamber including an anode chamber and a cathode chamber, the method having the steps of:

determining a critical value for an operating parameter of the fuel cell system, said critical value characterizing a flooding of the reactant chamber, monitoring the operating parameter to check if the critical value has been reached, setting a first threshold and a second threshold for a counter, monitoring the counter to check if the first threshold and the second threshold have been exceeded, performing a purge process of the anode chamber, when the operating parameter has reached the critical value, and when the counter has exceeded the first threshold, and performing the purge process of the cathode chamber when the operating parameter has reached the critical value and when the counter has exceeded the second threshold.

2. The method according to claim 1, wherein the operating parameter monitored for reaching the critical value is dependent on at least one of the following parameters:

electrical current generated by the fuel cell system, and/or volume flow of a gas mixture directed through the reactant chamber of the fuel cell system, and/or Reynolds number specific to a flow in the reactant chamber of the fuel cell system.

3. The method according to claim 2, wherein the operating parameter is monitored for dropping below the critical value.

4. The method according to claim 1, wherein the operating parameter monitored for reaching the critical value is dependent on at least one of the following parameters:

a pressure drop (Ap) occurring across the reactant chamber of the fuel cell system.

5. The method according to claim 4, wherein the operating parameter is monitored for exceeding the critical value.

6. The method according to claim 1, wherein the counter being monitored for exceeding the first threshold and the second threshold is dependent on at least one of the following parameters:

time, and/or integral value for current generated by the fuel cell system over a time.

7. The method according to claim 6, wherein the purge process of the reactant chamber is performed by increasing a volume flow and/or mass flow rate of a reactant-containing gas mixture.

8. The method according to claim 1, wherein an amount of water in the reactant chamber of the fuel cell system is modeled and/or estimated using the operating parameter, and/or when determining the critical value of the operating parameter and/or the first threshold and the second threshold of the counter, an actual amount of water in the reactant chamber of the fuel cell system is taken into account.

9. The method according to claim 1, wherein the method comprises at least one of the following steps:

setting the counter to zero, when a purge process of the reactant chamber has been performed, and/or when the operating parameter exits the critical value and/or reaches a safe value.

10. The method according to claim 1, wherein the method is performed for the anode chamber and the cathode chamber of the fuel cell system, the method performed for the anode chamber at least partially overlapping the method performed for the cathode chamber.

11. The method according to claim 10, wherein prior to monitoring the counter for exceeding the first threshold and the second threshold, it is checked whether a purge process of the reactant chamber of the fuel cell system is performed.

12. The method according to claim 1, wherein determining the critical value for the operating parameter includes directly measuring an amount of water in the reactant chamber.

13. The method according to claim 1, wherein the method is performed for the anode chamber and the cathode chamber successively.

* * * * *